(12) United States Patent
Seki et al.

(10) Patent No.: US 8,079,028 B2
(45) Date of Patent: Dec. 13, 2011

(54) INFORMATION PROCESSING DEVICE AND METHOD, RECORDING MEDIUM AND PROGRAM

(75) Inventors: Yasuharu Seki, Chiba (JP); Tatsuya Konno, Tokyo (JP); Norihiro Nagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1233 days.

(21) Appl. No.: 10/516,932

(22) PCT Filed: Mar. 12, 2004

(86) PCT No.: PCT/JP2004/003339
§ 371 (c)(1),
(2), (4) Date: Dec. 14, 2004

(87) PCT Pub. No.: WO2004/099973
PCT Pub. Date: Nov. 18, 2004

(65) Prior Publication Data
US 2005/0262163 A1    Nov. 24, 2005

(30) Foreign Application Priority Data
May 7, 2003  (JP) ................................. 2003-128668

(51) Int. Cl.
G06F 9/44      (2006.01)
G06F 15/16     (2006.01)
G06F 15/177    (2006.01)
(52) U.S. Cl. ......... 717/171; 717/168; 709/217; 709/221
(58) Field of Classification Search .................. 717/168, 717/171; 707/203
See application file for complete search history.

(56) References Cited

U.S. PATENT DOCUMENTS

| | | | |
|---|---|---|---|
| 5,835,911 A | | 11/1998 | Nakagawa et al. |
| 5,889,860 A | * | 3/1999 | Eller et al. ...................... 705/51 |
| 5,974,454 A | | 10/1999 | Apfel et al. |
| 6,167,567 A | * | 12/2000 | Chiles et al. .................. 717/173 |
| 6,327,584 B1 | * | 12/2001 | Xian et al. ........................ 707/1 |
| 6,434,744 B1 | * | 8/2002 | Chamberlain et al. ......... 717/168 |
| 6,460,023 B1 | * | 10/2002 | Bean et al. ...................... 705/54 |
| 6,493,871 B1 | * | 12/2002 | Welch et al. .................. 717/173 |
| 6,535,911 B1 | * | 3/2003 | Miller et al. .................. 709/217 |

(Continued)

FOREIGN PATENT DOCUMENTS

| | | |
|---|---|---|
| EP | 0 841 615 A2 | 5/1998 |
| EP | 1 187 012 A2 | 3/2002 |
| JP | 09-251355 | 9/1997 |

(Continued)

Primary Examiner — Kevin Bates
Assistant Examiner — Robert B McAdams
(74) Attorney, Agent, or Firm — Oblon, Spivak, McClelland, Maier & Neustadt, L.L.P.

(57) ABSTRACT

The present invention relates to an apparatus and a method for information processing, a recording medium, and a program that can provide newest functions in a plurality of applications. A PC 1 reads a UD information file 14 including functional generation information of a setup program 13 from a loaded optical disk 3, and obtains a UD information file 16 including functional generation information of a setup program 15 registered in a server 4 via a network 2. Then, the PC 1 compares the functional generation information of the UD information file 14 on the optical disk 3, the UD information file 16 of the server 4, and a UD information registry 12, and updates an application program 11 and the UD information registry 12 using the setup program corresponding to the newest functional generation. The present invention is applicable to an information providing system that provides music content distribution service having a copyright managing function via a network.

18 Claims, 14 Drawing Sheets

U.S. PATENT DOCUMENTS

| | | | |
|---|---|---|---|
| 6,658,090 B1 * | 12/2003 | Pehkonen et al. | 379/9.01 |
| 6,751,794 B1 * | 6/2004 | McCaleb et al. | 717/168 |
| 7,702,101 B2 * | 4/2010 | Malcolm et al. | 380/37 |
| 2002/0184499 A1 | 12/2002 | Taguchi et al. | |
| 2002/0194356 A1 * | 12/2002 | Chan et al. | 709/231 |
| 2004/0030902 A1 * | 2/2004 | Asano et al. | 713/176 |

FOREIGN PATENT DOCUMENTS

| | | |
|---|---|---|
| JP | 9-251355 | 9/1997 |
| JP | 2001-331337 | 11/2001 |
| JP | 2002-304298 | 10/2002 |
| WO | WO 00/58830 | 10/2000 |

* cited by examiner

F I G. 3

| | |
|---|---|
| VERSION | VERSION INFORMATION OF FUNCTIONAL GENERATION |
| UPDATE SERVER | URL INFORMATION OF SERVER FROM WHICH TO OBTAIN UD INFORMATION FILE |
| UPDATE SITE | URL INFORMATION OF UPDATE SITE |
| UPDATE CHECK | INFORMATION ON DATE AND TIME OF NEXT UPDATE CHECK |
| UPDATE DIALOG | UPDATE DIALOG DISPLAY INFORMATION |

12

F I G. 1 1

|  | APPLICATION 11 | APPLICATION 51 |
|---|---|---|
| VERSION OF APPLICATION | Ver. $\alpha$ | Ver. $\beta$ |
| CRYPTOGRAPHIC KEY | m, m+1 | m, m+1 |
| FUNCTION | A, B, C | A, B, C |

F I G. 1 2

| VERSION OF FUNCTIONAL GENERATION | n | n+1 |
|---|---|---|
| CRYPTOGRAPHIC KEY | m | m+1 |
| FUNCTION | A, B | A, B, C |

US 8,079,028 B2

INFORMATION PROCESSING DEVICE AND METHOD, RECORDING MEDIUM AND PROGRAM

TECHNICAL FIELD

The present invention relates to an apparatus and a method for information processing, a recording medium, and a program, and particularly to an apparatus and a method for information processing, a recording medium, and a program that can provide newest functions in a plurality of applications.

BACKGROUND ART

Conventionally, read-only recording media such as CD (Compact Disk) and the like are used as a form for distribution of application software products. After the distribution of these software products, a case often occurs in which a program defect is corrected or a functional improvement is added, thus making information recorded on the CD old information.

In order to deal with such a case, Japanese Patent Laid-Open No. 2001-117767, for example, proposes a method in which when information recorded on a recording medium is used, an application on the recording medium is started, latest rereading table information is obtained from an update information server or the like via a network, and the information recorded on the recording medium is used on the basis of the rereading table information.

Also, in the case of some applications, when the application software distributed by recording media is installed, the applications are first installed using a setup recorded on the recording media, identify a list of functions to be used after the installation, periodically check an information providing server via a network, and update functions when there is a difference.

Further, there are some applications that, at a time of setup of the applications, start a setup recorded on a recording medium, inquire of an information providing server whether there is a setup newer than the setup recorded on the recording medium, and when there is a setup newer than the setup recorded on the recording medium, download the setup from the information providing server, and then perform installation using the new setup.

As described above, the application software distributed by recording media first installs or starts the setup recorded on the recording media, inquires of the information providing server, and then installs the newest setup, whereby the newest functions can be updated and retained.

Recently, music content distribution service (EMD (Electronic Music Distribution)) having a copyright managing function has been developing using networks and CDs. In a case of a leakage of a cryptographic key or breaking of an encryption method of the copyright managing function by a malicious person, EMD deals with the case by updating the managing function of software to a new managing function and updating a functional generation.

In the case of EMD distribution using CDs, however, even when a server is to be accessed using software fixed within a CD as in the above-described software to obtain newest functions, the server cannot be accessed using the software fixed within the CD due to a leakage of a cryptographic key or breaking of an encryption method of a managing function of the software fixed within the CD. It is therefore difficult to support EMD with the updated functional generation.

Furthermore, in the case of the above-described software, while it is possible to update one piece of software with newest functions, even when a plurality of pieces of software using the same functions are present in a PC, at a time of updating the functions of the one piece of software, the functions of the other pieces of software cannot be updated simultaneously even though the functions of the other pieces of software are the same as those of the one piece of software.

DISCLOSURE OF THE INVENTION

The present invention has been made in view of the above, and it is accordingly an object of the present invention to provide the newest functions in a plurality of applications.

According to the present invention, there is provided an information processing apparatus characterized by including: managing means for managing first functional generation information as functional information of software stored in a memory; obtaining means for obtaining second functional generation information as functional information of software registered in an information providing apparatus via a network on a basis of the first functional generation information; comparing and determining means for comparing the first functional generation information and the second functional generation information with each other and determining newest functional generation information; and information updating means for, when the comparing and determining means determines that the second functional generation information is newer than the first functional generation information, updating the first functional generation information to the second functional generation information.

The information processing apparatus can further include passage determining means for determining whether a predetermined time has passed on a basis of the first functional generation information, and when the passage determining means determines that the predetermined time has passed, the obtaining means can obtain the second functional generation information registered in the information providing apparatus via the network.

The information processing apparatus can further include software updating means for updating the software stored in the memory using software corresponding to the second functional generation information when the comparing and determining means determines that the second functional generation information is newer than the first functional generation information.

The information processing apparatus can further include function determining means for determining whether the software has a function corresponding to the second functional generation information when the comparing and determining means determines that the second functional generation information is newer than the first functional generation information, and when the function determining means determines that the software does not have the function corresponding to the second functional generation information, the software updating means can update the software stored in the memory using the software corresponding to the second functional generation information.

The information processing apparatus can further include: medium determining means for determining whether a recording medium is loaded; and reading means for reading third functional generation information as functional generation of software recorded on the recording medium when the medium determining means determines that the recording medium is loaded; wherein the comparing and determining means compares the third functional generation information as well as the first functional generation information and the second functional generation information with each other and determines newest functional generation information; the information updating means updates the first functional generation information to the newest functional generation information; and the software updating means updates the software stored in the memory using software corresponding to the newest functional generation information.

When the obtaining means does not obtain the second functional generation information via the network, the comparing and determining means compares the first functional generation information and the third functional generation information with each other, and determines the newest functional generation information.

When the comparing and determining process determines that the second functional generation information and the third functional generation information are identical with each other, the information updating means updates the first functional generation information to the third functional generation information, and the software updating means can update the software stored in the memory using software corresponding to the third functional generation information.

According to the present invention, there is provided an information processing method characterized by including: an obtaining step for obtaining second functional generation information as functional information of software registered in an information providing apparatus via a network on a basis of first functional generation information as functional information of software stored in a memory; a comparing and determining step for comparing the first functional generation information and the second functional generation information with each other and determining newest functional generation information; and an information updating step for, when it is determined by a process of the comparing and determining step that the second functional generation information is newer than the first functional generation information, updating the first functional generation information to the second functional generation information.

According to the present invention, there is provided a program recorded on a recording medium, the program characterized by including: an obtaining step for obtaining second functional generation information as functional information of software registered in an information providing apparatus via a network on a basis of first functional generation information as functional information of software stored in a memory; a comparing and determining step for comparing the first functional generation information and the second functional generation information with each other and determining newest functional generation information; and an information updating step for, when it is determined by a process of the comparing and determining step that the second functional generation information is newer than the first functional generation information, updating the first functional generation information to the second functional generation information.

According to the present invention, there is provided a program characterized by including: an obtaining step for obtaining second functional generation information as functional information of software registered in an information providing apparatus via a network on a basis of first functional generation information as functional information of software stored in a memory; a comparing and determining step for comparing the first functional generation information and the second functional generation information with each other and determining newest functional generation information; and an information updating step for, when it is determined by a process of the comparing and determining step that the second functional generation information is newer than the first functional generation information, updating the first functional generation information to the second functional generation information.

In the present invention, second functional generation information as functional information of software registered in an information providing apparatus is obtained via a network on a basis of first functional generation information as functional information of software stored in a memory, the first functional generation information and the second functional generation information are compared with each other, and newest functional generation information is determined. Then, when it is determined that the second functional generation information is newer than the first functional generation information, the first functional generation information is updated to the second functional generation information.

BRIEF DESCRIPTION OF THE DRAWINGS

FIG. 3 is a diagram showing an example of structure of a UD information register in FIG. 1;

FIG. 11 is a diagram showing an example of configurations of applications in the PC in FIG. 1;

FIG. 12 is a diagram showing an example of configurations of functional generations in the PC in FIG. 1;

BEST MODE FOR CARRYING OUT THE INVENTION

A preferred embodiment of the present invention will hereinafter be described with reference to the drawings.

Figure 1:
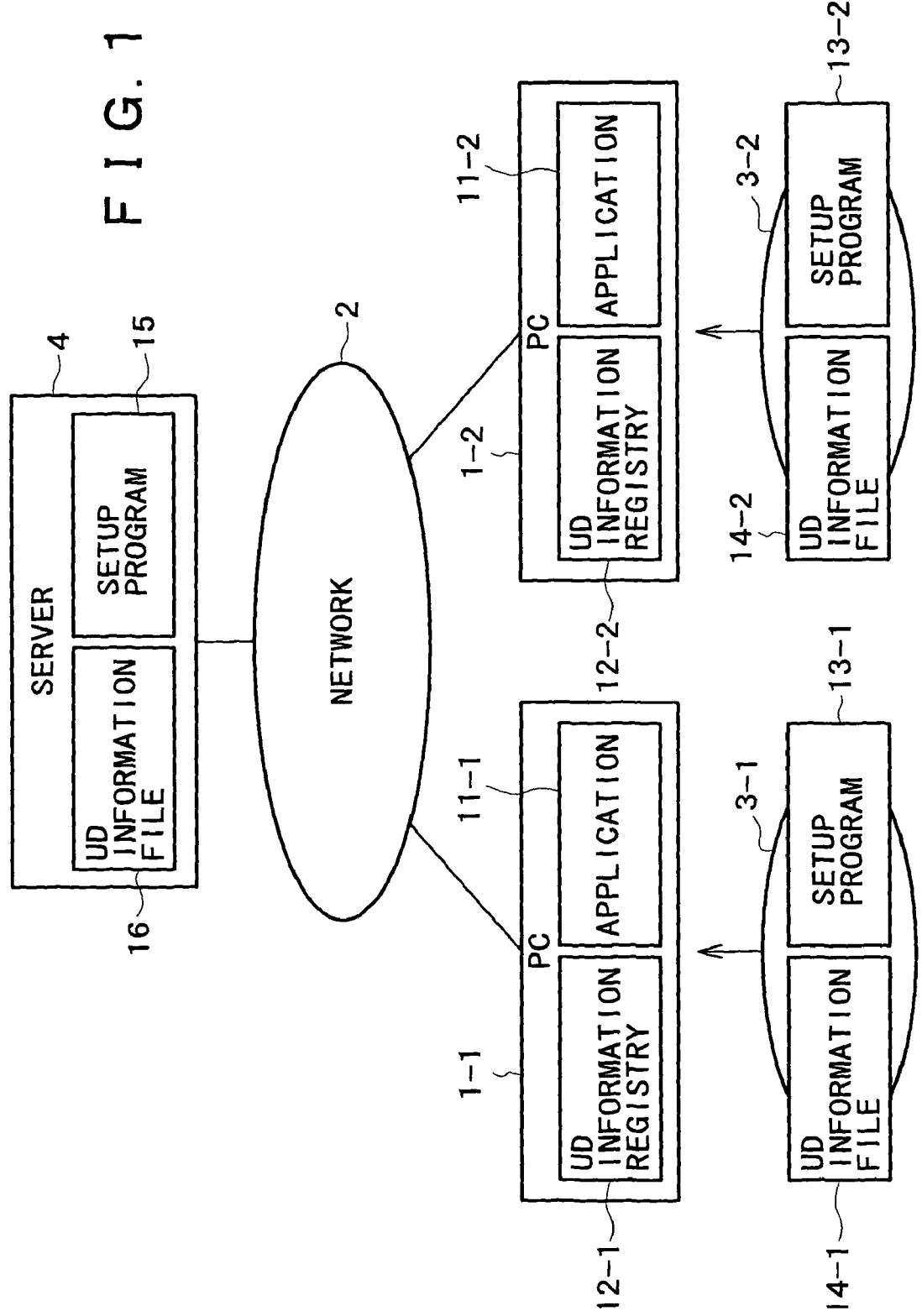
FIG. 1 is a diagram showing an example of configuration of an information providing system to which the present invention is applied.

FIG. 1 shows an example of configuration of an information providing system to which the present invention is applied. A network 2 typified by the Internet is connected with a PC (personal computer) 1-1 that allows an optical disk 3-1 to be loaded therein and unloaded therefrom, a PC 1-2 that allows an optical disk 3-2 to be loaded therein and unloaded therefrom (these PCs and optical disks will hereinafter be described simply as a PC 1 and an optical disk 3 when the PCs and optical disks do not need to be individually distinguished from each other), and a server 4 for providing the PC 1 with music content distribution service (EMD (Electronic Music Distribution)) with a copyright managing function. While in this example, only two PCs and one server are shown, the network 2 is connected with an arbitrary number of PCs and servers.

The PC 1 has an installed application 11. The application 11 is application software for receiving the EMD service provided from the server 4. Also, the PC 1 manages a UD (update) information file including information of a functional generation of the application 11 in a UD (update) information registry 12, separately from a version of the application 11. The functional generation collectively defines a combination of cryptographic keys, functions, protocols or the like required in the service at a certain point in time. The UD information file is not unique to the application 11; the UD information file is also common to another application using a functional generation as a definition of a combination of the same cryptographic keys, functions, protocols or the like as the application 11 in the PC 1.

The UD information registry 12 manages the information of the functional generation defined for the application 11 at a time of installation of the application 11 onto the PC 1. Incidentally, in this case, when the PC 1 includes a plurality of applications using the same functional generation as that of the application 11, the information managed by the UD information registry 12 corresponds to the plurality of applications.

The functional generation is updated by an EMD service provider each time the combination of cryptographic keys, functions, protocols or the like is changed in response to a service request or a security problem caused by breaking of an encryption method or a leakage of a cryptographic key, for example. Thus, when the information of the functional generation of the application 11 which information is managed in the UD information registry 12 is older than a functional generation required by the server 4, the PC 1 cannot receive the EMD service provided from the server 4.

In addition, the PC 1 allows an optical disk 3 to be loaded therein and unloaded therefrom in order to receive the EMD service. The optical disk 3 includes a recorded recording medium such as a Labelgate CD (Compact Disk) for EMD or the like. Recorded on the optical disk 3 are contents whose copyright is protected by means for encryption or the like as well as a setup program 13 for updating the application 11 for reading the contents and a UD information file 14. The UD information file 14 has information of a functional generation defined for the application 11 at a time of recording the setup program 13.

When the optical disk 3 is loaded into the PC 1, the PC 1 reads the UD information file 14 from the loaded optical disk 3, and thereby obtains the information of the functional generation of the setup program 13. Further, the PC 1 accesses the server 4 via the network 2 to obtain a UD information file 16 including information of a functional generation of a setup program 15 for updating the application 11 which program is registered in the server 4. Then, the PC 1 compares the information of the functional generations of the UD information file 14 on the optical disk 3, the UD information file 16 of the server 4, and the UD information registry 12, determines the information of the newest functional generation, and updates the information of the UD information registry 12 to the information of the UD information file having the newest functional generation. Also, the PC 1 updates the application program 11 using the setup program corresponding to the newest functional generation. It is to be noted that in updating the application 11, only a necessary part of the cryptographic keys, functions, or protocols constituting the information of the functional generation is updated, instead of updating the whole of the application 11.

Figure 2:
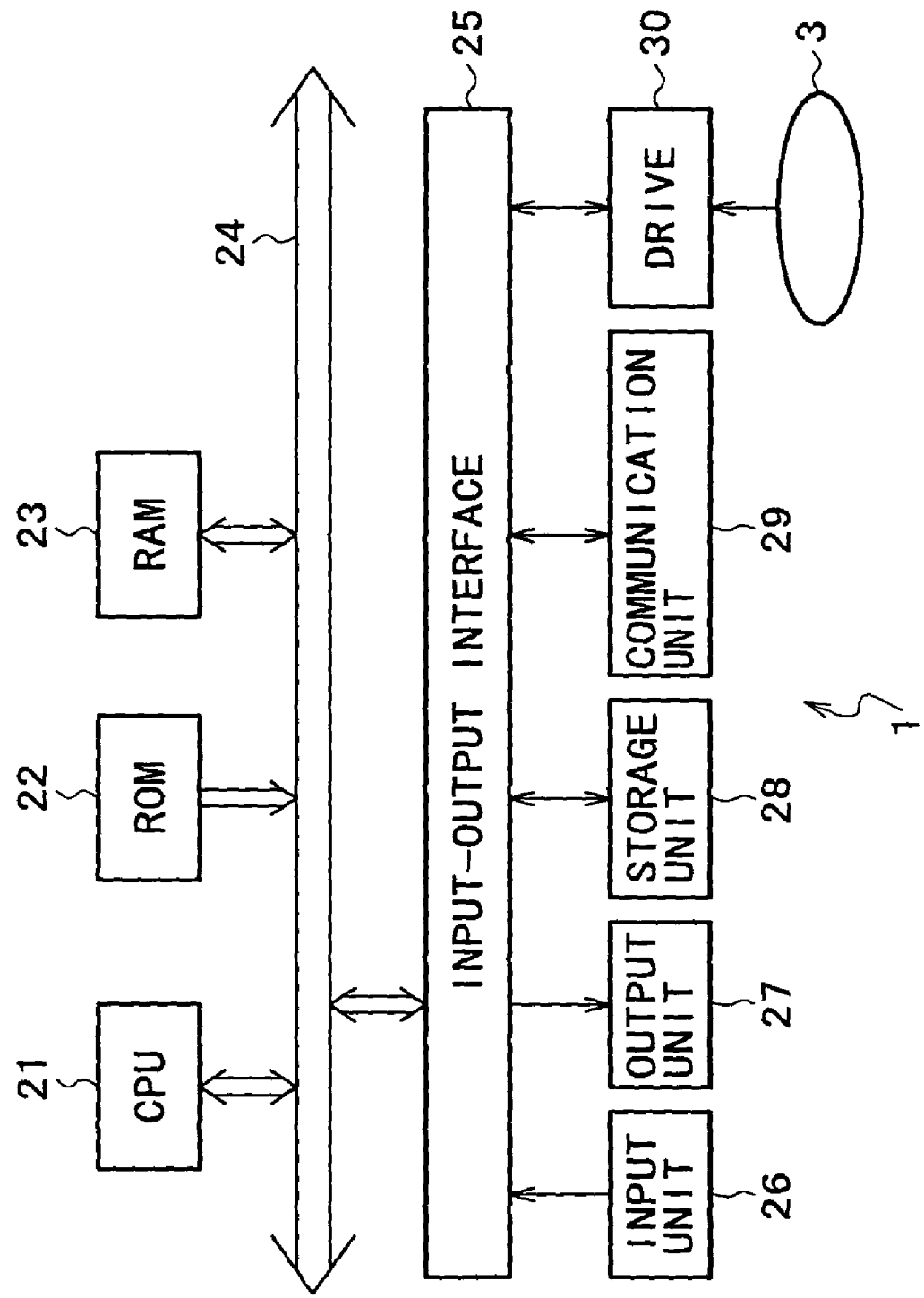
FIG. 2 is a block diagram showing an example of configuration of a PC in FIG. 1.

As described above, the functional generation of the application 11 is updated to the newest functional generation. Thus, when started by a user, the application 11 checks the information of the functional generation of the UD information registry 12, and accesses the server 4 via the network 2 using a combination of cryptographic keys, functions, protocols or the like based on the functional generation to receive the EMD service. Thus, the PC 1 can read contents and the like recorded on the optical disk 3 or a storage unit 28 (FIG. 2).

The server 4 has the setup program 15 for the application 11 for the PC 1 to receive the EMD service, and the UD information file 16. It is to be noted that the setup program 15 updates only a necessary part of the cryptographic keys, functions, or protocols constituting the information of the functional generation, instead of updating the whole of the application 11. Therefore, by using the setup program 15, it is possible to update another application using the same combination of cryptographic keys, functions, protocols or the like as the application 11.

In response to a service request or a security problem caused by breaking of an encryption method, a leakage of a cryptographic key, or the like, the server 4 changes the combination of cryptographic keys, functions, protocols or the like, updates the setup program 15, and correspondingly updates the information of the functional generation of the UD information file 16. The server 4 provides the UD information file 16 and the setup program 15 to the PC 1 that accesses the server 4 via the network 2 on the basis of the information managed in the UD information registry 12. Further, the server 4 has a user of the PC 1 registered in advance therewith, and the server 4 provides the EMD service to the PC 1 that accesses the server 4 using the application 11 having the information of a proper functional generation.

Incidentally, while the application 11 is already installed on the PC 1 in FIG. 1, a setup program for the application 11 and a UD information file may also be recorded in the PC 1 so that at a time of installation of the application 11, the information of the functional generations of the UD information files of the PC 1, the optical disk 3, and the server 4 is compared to install the setup program having the information of the newest functional generation.

FIG. 2 shows a configuration of the PC 1. A CPU (Central Processing Unit) 21 in FIG. 2 performs various processing according to a program stored in a ROM (Read Only Memory) 22 or a program such as the application 11 or the like loaded into a RAM (Random Access Memory) 23 from a storage unit 28. The RAM 23 also stores data and the like necessary for the CPU 21 to perform various processing, as required.

The CPU 21, the ROM 22, and the RAM 23 are connected to each other via a bus 24. The bus 24 is also connected with an input-output interface 25.

The input-output interface 25 is connected with an input unit 26 including a keyboard, a mouse and the like, an output unit 27 including a display formed by a CRT (Cathode Ray Tube), an LCD (Liquid Crystal Display) or the like, a speaker and the like, a storage unit 28 including a hard disk or the like, and a communication unit 29 including a modem, a terminal adapter or the like. The communication unit 29 performs processing for communication with the server 4 and the like via the network 2 such as the Internet, an intranet or the like.

The input-output interface 25 is also connected with a drive 30, into which the optical disk 3 is inserted. A computer program read therefrom is installed in the storage unit 28 as required.

The server 4 is basically configured in a manner similar to that of the PC 1. Therefore the configuration of the PC 1 in FIG. 2 will be cited also as the configuration of the server 4 in the following description.

FIG. 3 shows a structure of the UD information registry 12 in the PC 1. In the example of FIG. 3, the UD information registry 12 includes registry keys of "version," "update server," "update site," "update check," and "update dialog."

In the "version," version information of the functional generation of the application 11 is registered. At the time of installation of the application 11, zero is specified. In the "update server," URL (Uniform Resource Locator) information of the server from which a UD information file is obtained is registered. The information of the "update server" is registered when the application 11 is installed. In this case, the URL information of the server 4 having the UD information file 16 registered therein is registered.

In the "update site," the URL information of a page in a site that provides a setup program for updating the application 11 is registered. In this case, the URL information of a page in a site of the server 4 that provides the setup program 15 is registered.

In the "update check," information on a date and time of a next update check, or information on a date and time when the UD information file 16 is to be obtained next from the server 4, is registered. Registered in the "update dialog" is update dialog display information indicating whether to turn on or off display of an update dialog indicating that information necessary for update is present in the server 4 as a result of update of the functional generation at the time of starting the application 11.

On the basis of the above-described information registered in the UD information registry 12, the CPU 21 of the PC 1 accesses the server 4 via the network 2 to update the functional generation of the application 11 and update the application 11 as required.

Figure 4:
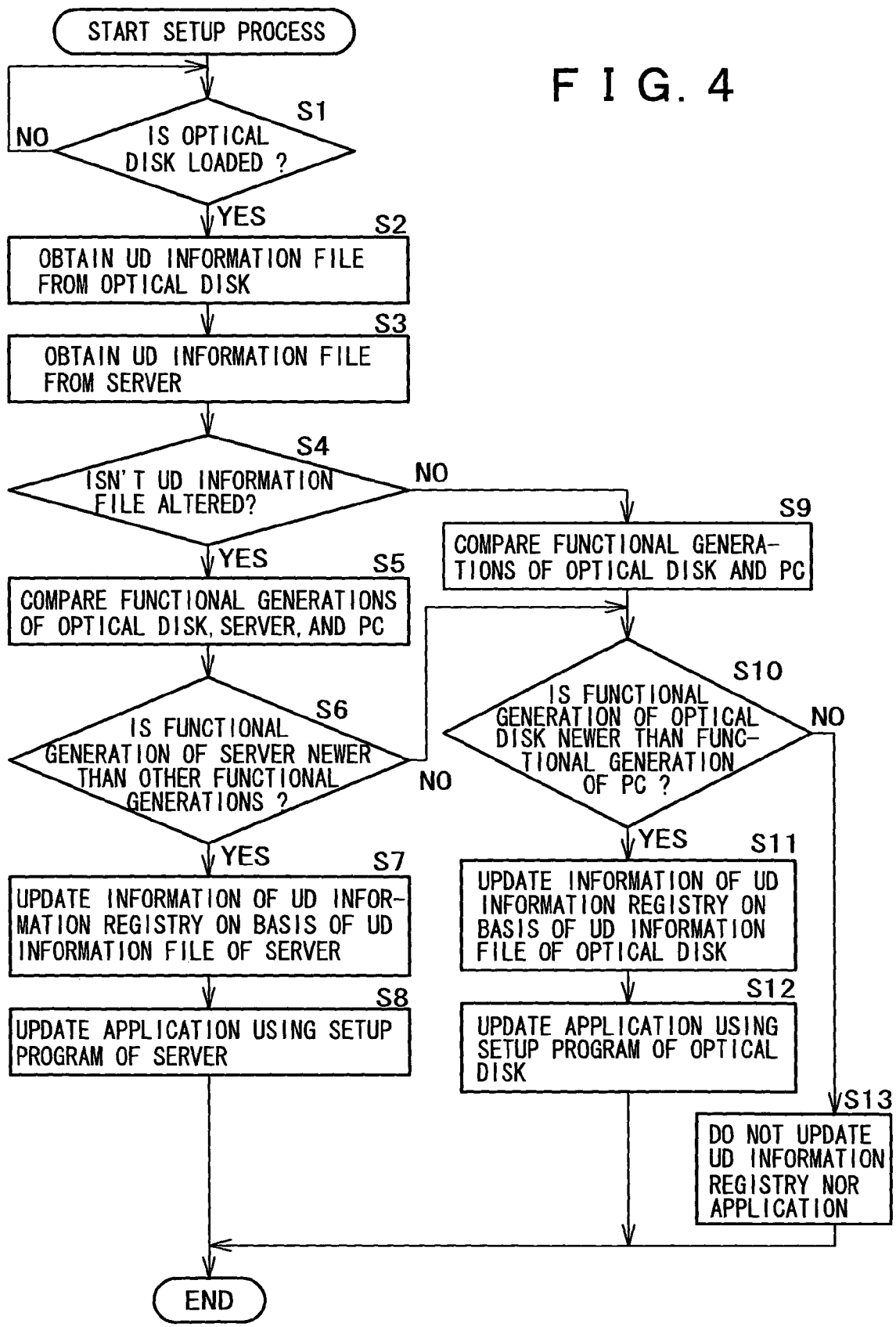
FIG. 4 is a flowchart of assistance in explaining a setup process of the PC in FIG. 1.

A setup process for the application 11 of the PC 1 will next be described with reference to FIG. 4. Incidentally, the setup process is performed when the optical disk 3 is loaded into the drive 30 to receive the EMD service provided from the server 4.

The user of the PC 1 loads the optical disk 3 into the drive 30 to receive the EMD service provided from the server 4. The CPU 21 stands by until the optical disk 3 is loaded into the drive 30. When the CPU 21 determines that the optical disk 3 is loaded, the process proceeds to step S2, where the CPU 21 controls the drive 30 to obtain the UD information file 14 recorded on the optical disk 3. The process then proceeds to step S3.

The UD information registry 12 of the PC 1 has registered therein the information of a UD information file when the application 11 is initially installed. Accordingly, the CPU 21 in step S3 controls the communication unit 29 to access the server 4 via the network 2 on the basis of the "update server" in the UD information registry 12 to obtain the UD information file 16 registered in the server 4. The process then proceeds to step S4.

Figure 5:
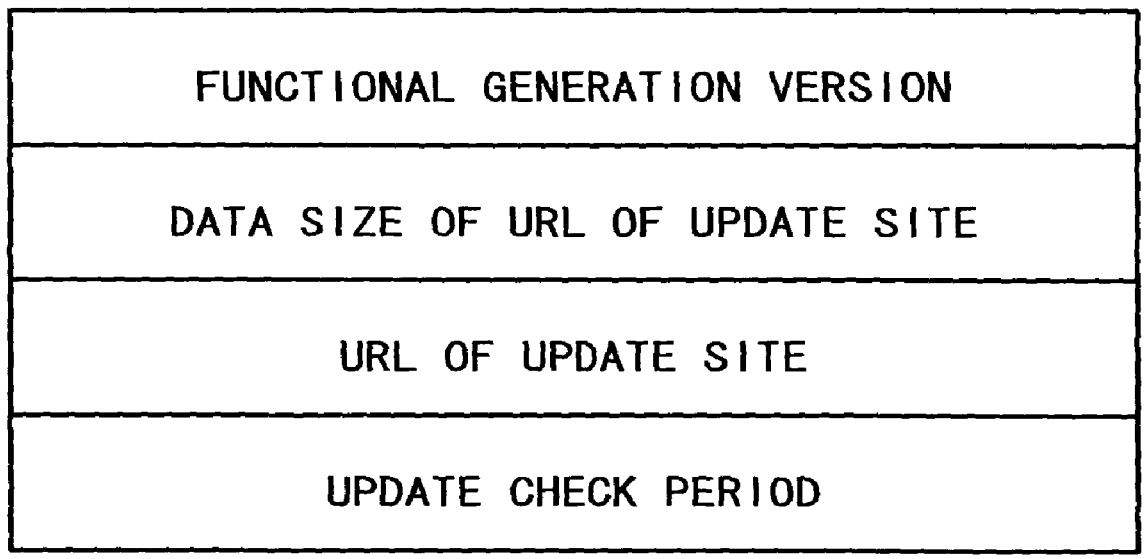
FIG. 5 is a diagram showing an example of structure of a UD information file in FIG. 1.

FIG. 5 shows an example of structure of the UD information file 16. The UD information file 16 in the example of FIG. 5 includes: a functional generation version designating the functional generation of the setup program 15 registered in the server 4; data size of a URL of an update site; the URL of the update site (page) that provides the setup program 15; and an update check period (in days in this case) representing a period before checking for a next update (a date and time scheduled for update to a next functional generation set by the service provider or the like).

Figure 6:
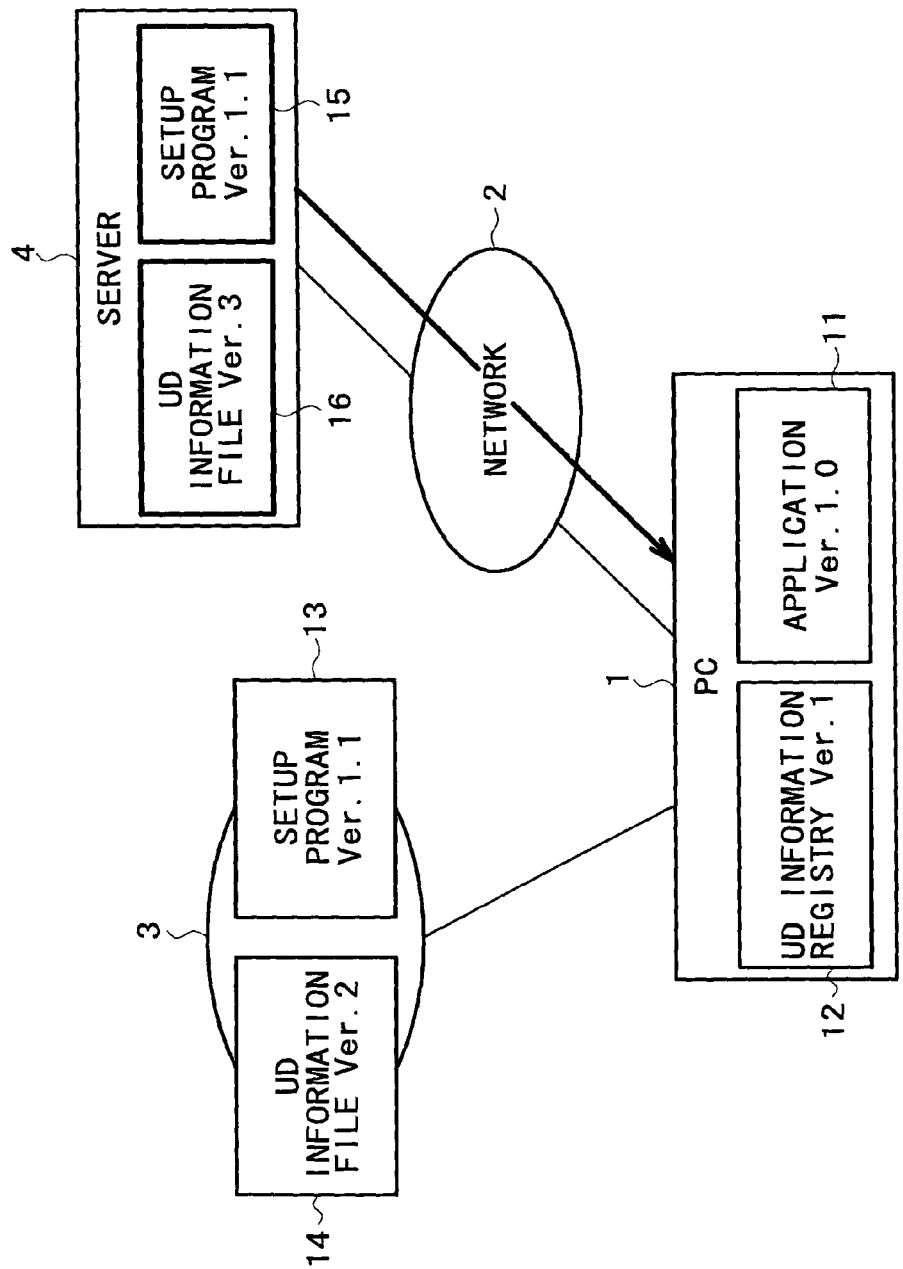
FIG. 6 is a diagram showing another example of configuration of the information providing system in FIG. 1.

In this case, the PC 1 has a predetermined cryptographic key set in advance in communication with the server 4. Accordingly, using the predetermined cryptographic key, the CPU 21 in step S4 determines whether the UD information file 16 obtained from the server 4 is altered. When the CPU 21 determines that the UD information file 16 obtained from the server 4 is not altered, the process proceeds to step S5, where the CPU 21 compares the versions of the functional generations of the UD information file 14 obtained from the optical disk 3, the UD information file 16 obtained from the server, and the "version" of the UD information register 12, as shown in FIG. 6. The process then proceeds to step S6, where the CPU 21 determines whether the version of the functional generation of the server 4 is newer than the versions of the other functional generations.

FIG. 6 shows an example of a combination of the versions of setup programs and UD information files. The version of the application 11 in the PC 1 is "Ver. 1.0," and the version of the functional generation of the UD information registry 12 is "Ver. 1." The version of the setup program 13 on the optical disk 3 is "Ver. 1.1," and the version of the functional generation of the UD information file 14 is "Ver. 2." The version of the setup program 15 in the server 4 is "Ver. 1.1," and the version of the functional generation of the UD information file 16 is "Ver. 3." Incidentally, in this case, the version of a setup program also represents the version of the application program.

As shown in the example of FIG. 6, the versions of the applications are independent of the versions of the functional generations. While the versions of the setup program 13 on the optical disk 3 and the setup program 15 in the server 4 are the same, only the versions of the functional generations are updated as shown by the version "Ver. 2" of the functional generation of the UD information file 14 and the version "Ver. 3" of the functional generation of the UD information file 16 when the combination of cryptographic keys, functions, protocols or the like is changed in response to a service request or a security problem caused by breaking of an encryption method or a leakage of a cryptographic key, for example.

Thus, in the example of FIG. 6, the CPU 21 in step S5 compares the version "Ver. 2" of the functional generation of the UD information file 14, the version "Ver. 3" of the functional generation of the UD information file 16, and the version "Ver. 1" of the functional generation of the UD information registry 12. When the CPU 21 determines in step S6 that the version of the functional generation of the server 4 is newer than the versions of the other functional generations, the process proceeds to step S7, where the information of the UD information registry 12 is updated (overwritten) on the basis of the UD information file 16 in the server. Specifically, the version of the functional generation of the UD information file 16 is registered in the "version" of the UD information registry 12; the update check period in the UD information file 16 is added to a time indicated by a clock included in the CPU 21, and the result is registered in the "update check" of the UD information registry 12; and the URL of the update site in the UD information file 16 is registered in the "update site" of the UD information registry 12. The information of the UD information registry 12 is thus updated, and then the process proceeds to step S8.

In step S8, the CPU 21 accesses the server 4 on the basis of the "update site" of the UD information registry 12, and then updates the application 11 using the setup program 15 of the server 4, whereby the setup process is ended. Specifically, the CPU 21 controls the communication unit 29 to download the setup program 15 from the update site for the setup program 15 of the server 4 via the network 2 on the basis of the URL in the "update site" of the UD information file 16 of the server 4, and updates only a necessary part of the cryptographic keys, functions, or protocols constituting the functional generation of the application 11 using the downloaded setup program 15.

When the PC 1 has another application using the same functional generation as the application 11, only a necessary part of cryptographic keys, functions, or protocols constituting the functional generation of the other application is updated. Incidentally, at this time, the same setup program 15 may be used, or another setup program for the other application may be registered in the same update site so that the setup program is downloaded for update simultaneously with the setup program 15.

Figure 7:
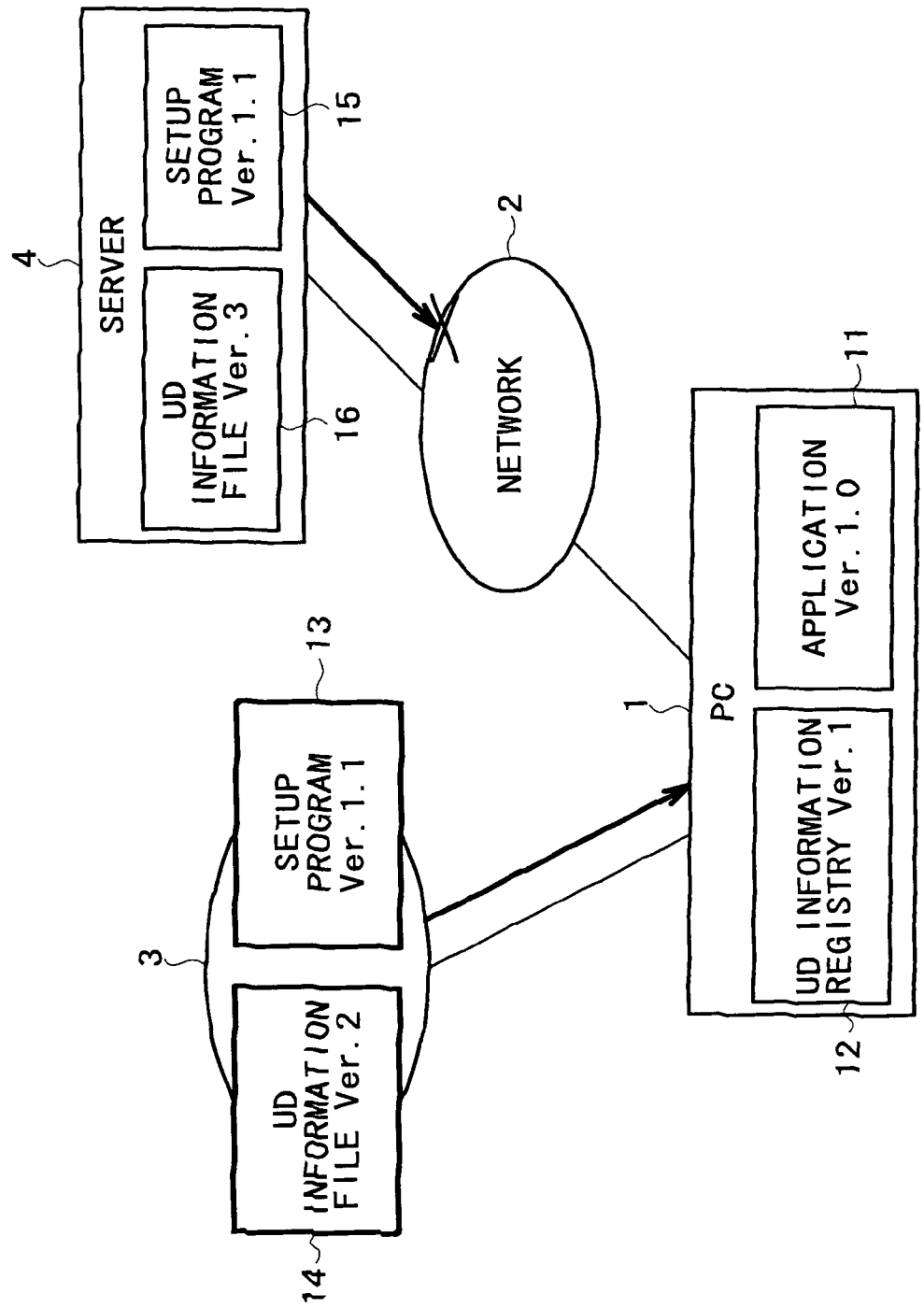
FIG. 7 is a diagram showing another example of configuration of the information providing system in FIG. 6.

On the other hand, when the CPU 21 determines in step S4 that the UD information file 16 obtained from the server 4 is altered, the process proceeds to step S9, where the CPU 21 compares the versions of the functional generations of the UD information file 14 obtained from the optical disk 3 and the UD information register 12, as shown in FIG. 7. The process then proceeds to step S10, where the CPU 21 determines whether the version of the functional generation of the optical disk 3 is newer than the version of the functional generation of the PC 1.

FIG. 7 shows another example of a combination of the versions of setup programs and UD information files. The version of the application 11 in the PC 1 is "Ver. 1.0," and the version of the functional generation of the UD information registry 12 is "Ver. 1." The version of the setup program 13 on the optical disk 3 is "Ver. 1.1," and the version of the functional generation of the UD information file 14 is "Ver. 2." The version of the setup program 15 in the server 4 is "Ver. 1.1," and the version of the functional generation of the UD information file 16 is "Ver. 3."

In the example of FIG. 7, as in the example of FIG. 6, the version "Ver. 3" of the functional generation of the UD information file 16 of the server 4 is the newest version. However, the UD information file 16 of the server 4 is not obtained by the PC 1 because of the alteration or some failure in communication on the network 2. Thus, in step S9, the CPU 21 of the PC 1 compares the version "Ver. 2" of the functional generation of the UD information file 14 and the version "Ver. 1" of the functional generation of the UD information registry 12. In step S10, the CPU 21 determines that the version "Ver. 2" of the functional generation of the optical disk 3 is newer than the version "Ver. 1" of the functional generation of the PC 1. The process then proceeds to step S11, where the information of the UD information registry 12 is updated (overwritten) on the basis of the UD information file 14 on the optical disk 3. The process then proceeds to step S12.

In step S12, the CPU 21 controls the drive 30 to read the setup program 13 on the optical disk 3, and then updates the application 11 using the read setup program 13, whereby the setup process is ended. Specifically, the CPU 21 controls the drive 30 to read the setup program 13 on the optical disk 3, and updates only a necessary part of cryptographic keys, functions, or protocols constituting the functional generation of the application 11 using the read setup program 13. Incidentally, also in the case of the setup program 13, when the PC 1 has another application using the same functional generation as the application 11, only a necessary part of cryptographic keys, functions, or protocols constituting the functional generation of the other application is updated.

Figure 8:
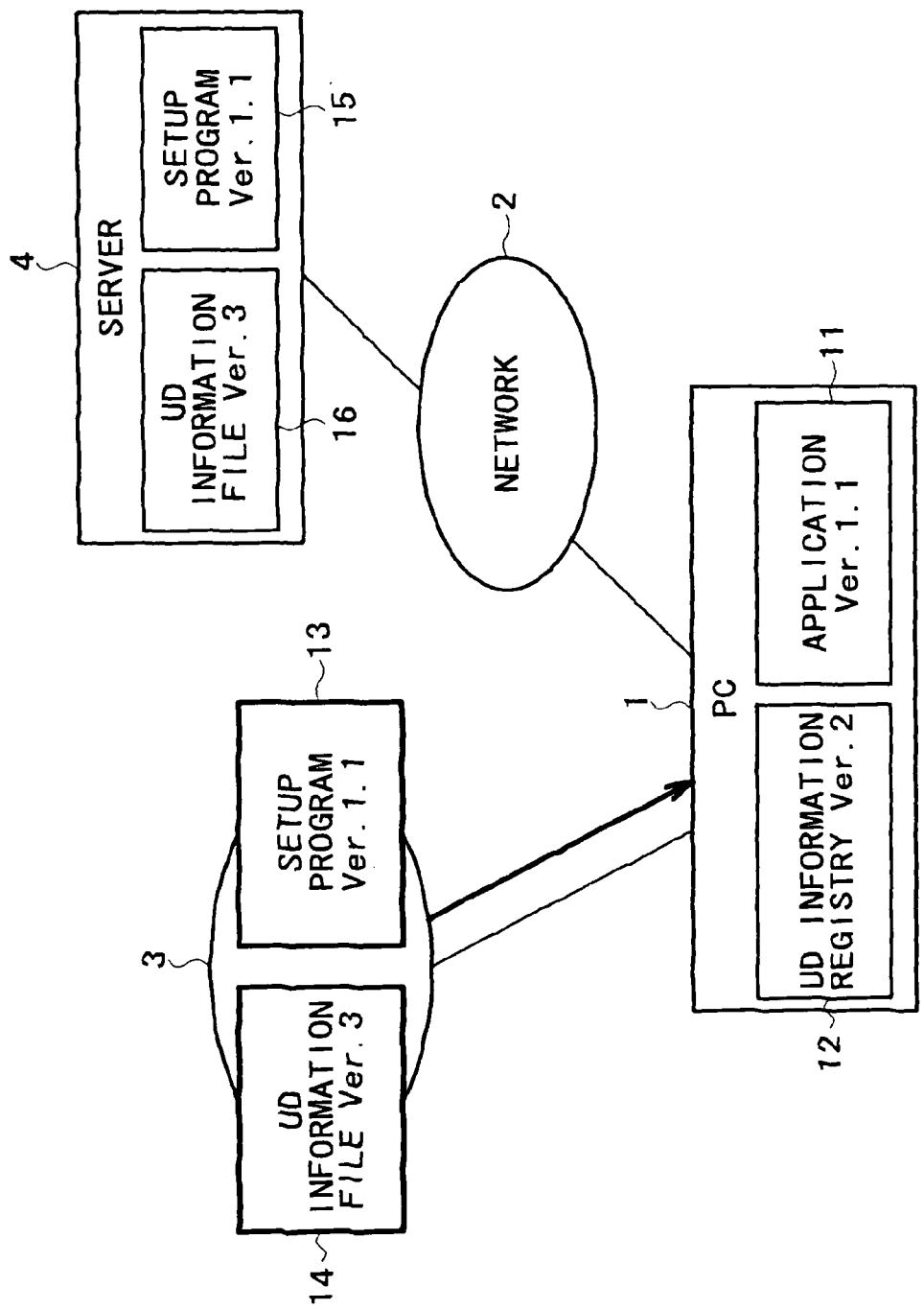
FIG. 8 is a diagram showing a further example of configuration of the information providing system in FIG. 6.

Also when the CPU 21 determines in step S6 that the version of the functional generation of the server 4 is not newer than the versions of the other functional generations as shown in FIG. 8, the process proceeds to step S10, where the CPU 21 determines whether the version of the functional generation of the optical disk 3 is newer than the version of the functional generation of the PC 1.

FIG. 8 shows another example of a combination of the versions of setup programs and UD information files. The version of the application 11 in the PC 1 is "Ver. 1.1," and the version of the functional generation of the UD information registry 12 is "Ver. 2." The version of the setup program 13 on the optical disk 3 is "Ver. 1.1," and the version of the functional generation of the UD information file 14 is "Ver. 3." The version of the setup program 15 in the server 4 is "Ver. 1.1," and the version of the functional generation of the UD information file 16 is "Ver. 3."

In the example of FIG. 8, the version "Ver. 3" of the functional generation of the UD information file 14 on the optical disk 3 and the version "Ver. 3" of the functional generation of the UD information registry 16 in the server 4 are the same. Thus, in the example of FIG. 8, the CPU 21 does not determine in step S6 that the version of the functional generation of the server 4 is newer than the versions of the other functional generations. In step S10, the CPU 21 determines that the version "Ver. 3" of the functional generation of the optical disk 3 is newer than the version "Ver. 2" of the functional generation of the PC 1. The CPU 21 proceeds to step S11 to update the information of the UD information registry 12 on the basis of the UD information file 14 on the optical disk 3. The process then proceeds to step S12, where the CPU 21 controls the drive 30 to read the setup program 13 on the optical disk 3, and then updates the application 11 using the read setup program 13, whereby the setup process is ended.

As described above, when the version of the functional generation of the UD information file 14 on the optical disk 3 and the version of the functional generation of the UD information file 16 in the server 4 are the same, the application 11 is updated using the setup program 13 on the optical disk 3. Therefore, a load of data transfer on the network 2 is reduced.

Figure 9:
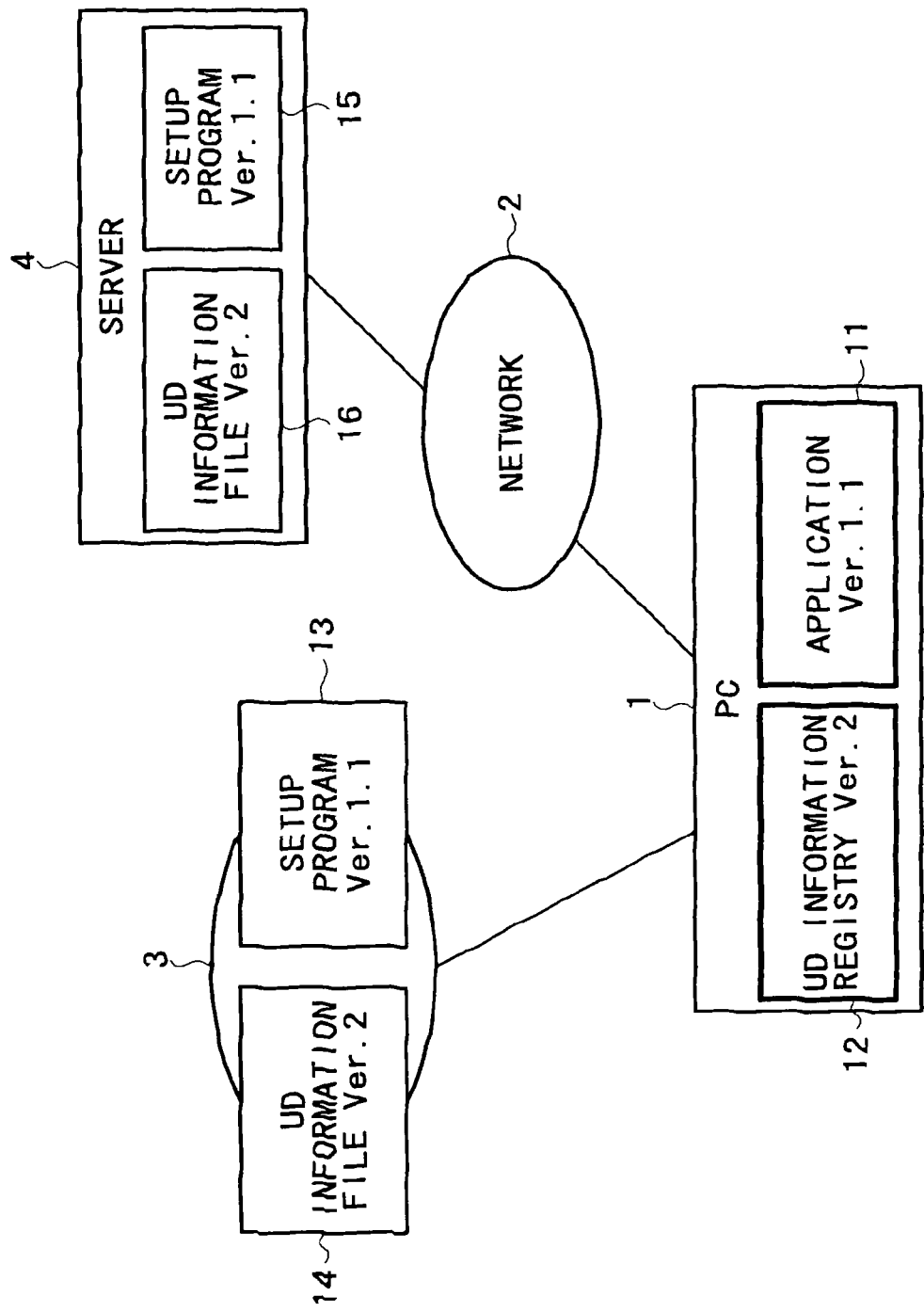
FIG. 9 is a diagram showing another example of configuration of the information providing system in FIG. 6.

On the other hand, when the CPU 21 determines in step S10 that the version of the functional generation of the optical disk 3 is not newer than the version of the functional generation of the PC 1 as shown in FIG. 9, the process proceeds to step S13, where the CPU 21 ends the setup process without updating the UD information registry 12 and the application 11.

FIG. 9 shows another example of a combination of the versions of setup programs and UD information files. The version of the application 11 in the PC 1 is "Ver. 1.1," and the version of the functional generation of the UD information registry 12 is "Ver. 2." The version of the setup program 13 on the optical disk 3 is "Ver. 1.1," and the version of the functional generation of the UD information file 14 is "Ver. 2." The version of the setup program 15 in the server 4 is "Ver. 1.1," and the version of the functional generation of the UD information file 16 is "Ver. 2."

In the example of FIG. 9, the version "Ver. 2" of the functional generation of the UD information register 12 in the PC 1 and the version "Ver. 2" of the functional generation of the UD information file 16 in the server 4 are the same. That is, it is not that only the version "Ver. 2" of the functional generation of the UD information file 16 is the newest version. Thus, in the example of FIG. 8, the CPU 21 does not determine in step S6 that the version of the functional generation of the server 4 is newer than the versions of the other functional generations. In step S10, the CPU 21 determines that the version "Ver. 2" of the functional generation of the optical disk 3 is not newer than (the same as) the version "Ver. 2" of the functional generation of the PC 1. The CPU 21 proceeds to step S13 to end the setup process without updating the information of the UD information registry 12 and the application 11.

As described above, the versions of the functional generations of the UD information file 14 obtained from the optical disk 3, the UD information file 16 obtained from the server, and the UD information register 12 are compared with each other, the functional generation is updated using the newest of the versions of the functional generations, and further the function of the application 11 is updated when necessary. Thus, it is possible to access the server 4 via the network 2 with the application 11 using a functional generation as a combination of old cryptographic keys, functions, or protocols in the PC 1 or the optical disk 3. Therefore refusal of provision of the EMD service by the server 4 is prevented. Further, a provider of the optical disk 3 does not need to update an old functional generation of the setup program 13 recorded on the optical disk 3 to a new functional generation at all times. Therefore increase in cost is prevented.

In addition, since the information of the functional generation is managed separately from the version of the application, when updating one application, it is possible to simultaneously update not only the functional generation of the application but also the functional generation of another application having the same functional generation. Thereby the user is saved the trouble of updating the application.

Figure 10:
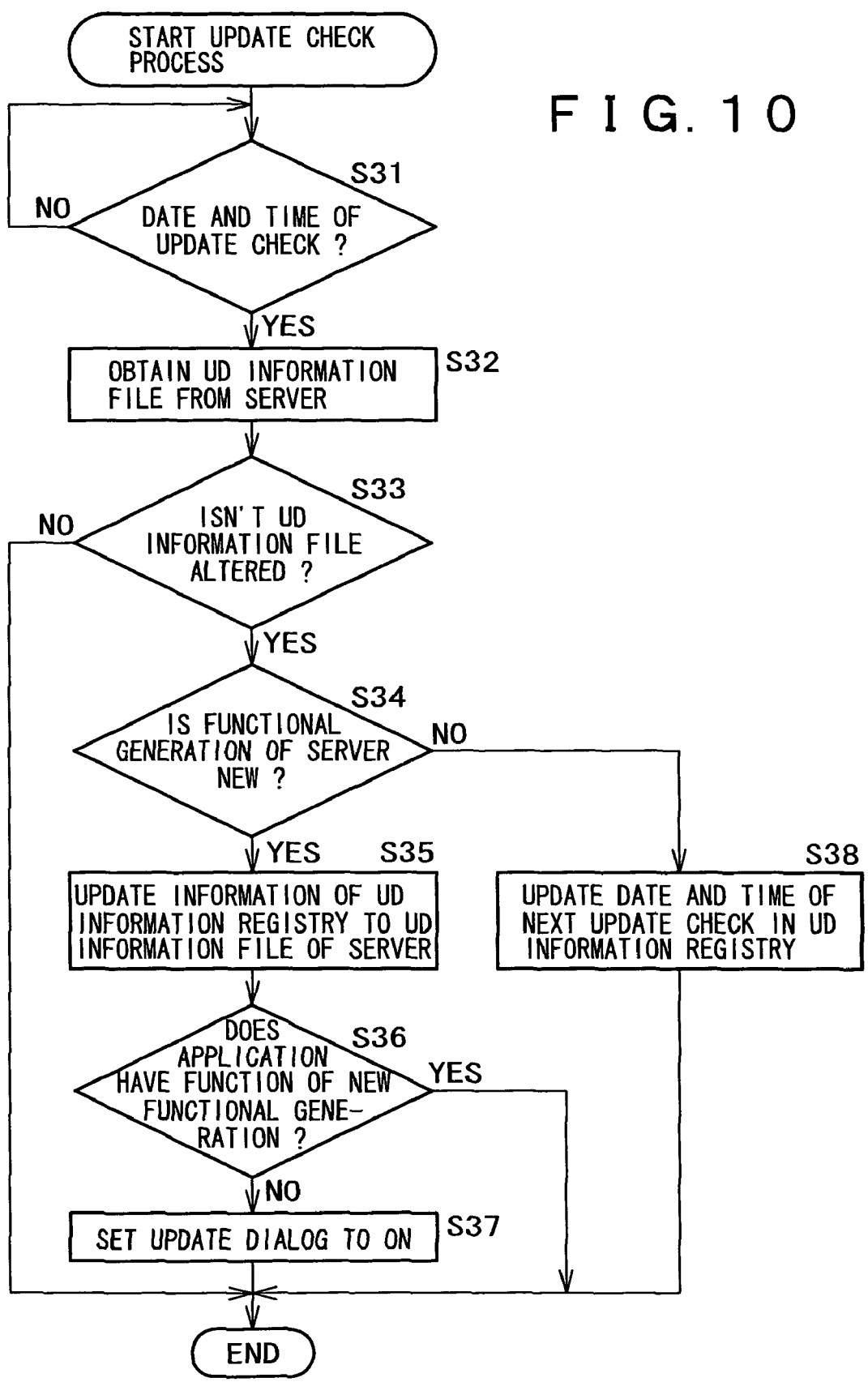
FIG. 10 is a flowchart of assistance in explaining an update check process of the PC in FIG. 1.

An update check process for the application 11 thus set up will be described with reference to a flowchart of FIG. 10. In this case, suppose that in addition to the application 11, the PC 1 has an application 51 using the same functional generation as the application 11.

FIG. 11 shows configurations of the application 11 and the application 51 in the PC 1. In the example of FIG. 11, the application 11 has an application version of "Ver. α," two kinds of cryptographic keys "m and m+1," and three kinds of functions "A, B, and C." The application 51 has an application version of "Ver. β," two kinds of cryptographic keys "m and m+1," and three kinds of functions "A, B, and C."

That is, while the applications have different versions, the applications have the same functional generation, hence the same cryptographic keys and functions. Thus, in this case, the UD information registry 12 can be shared by the two applications. Incidentally, each application may have a separate UD information registry.

In the setup process described above with reference to FIG. 4, information on a date and time of a next update check is registered in the "update check" of the UD information registry 12 in the PC 1. Thus, the CPU 21 stands by in step S31 in FIG. 10 until the CPU 21 determines that the time indicated by the built-in clock is the date and time of the next update check in the "update check" (represents the date and time of the next update check in the "update check"). When the CPU 21 determines that the time indicated by the clock is the date and time of the next update check in the "update check," the CPU 21 in step S32 controls the communication unit 29 to access the server 4 via the network 2 on the basis of the "update site" of the UD information registry 12 to obtain the UD information file 16 registered in the server 4. The process then proceeds to step S33.

In step S33, using a predetermined cryptographic key, the CPU 21 determines whether the UD information file 16 obtained from the server 4 is altered. When the CPU 21 determines that the UD information file 16 obtained from the server 4 is altered, the CPU 21 ends the update check process. When the CPU 21 determines in step S33 that the UD information file 16 obtained from the server 4 is not altered, the process proceeds to step S34, where the CPU 21 determines that the version of the functional generation of the UD information file 16 obtained from the server 4 is newer than the version of the functional generation in the UD information register 12. When the CPU 21 determines that the version of the functional generation of the server 4 is newer than the version of the functional generation in the UD information register 12, the process proceeds to step S35.

The CPU 21 in step S35 updates (overwrites) the UD information registry 12 on the basis of the UD information file 16, and then proceeds to step S36. Specifically, the version of the functional generation of the UD information file 16 is registered in the "version" of the UD information registry 12; the update check period in the UD information file 16 is added to the time indicated by the clock included in the CPU 21, and the result is registered in the "update check" of the UD information registry 12; and the URL of the update site in the UD information file 16 is registered in the "update site" of the UD information registry 12. The information of the UD information registry 12 is thus updated.

When the UD information registry 12 is updated to the functional generation of the UD information file 16, the CPU 21 in step S36 determines whether the application 11 and the application 51 have a cryptographic key and a function used in the updated functional generation.

FIG. 12 shows a configuration example of a combination of functional generations. In the example of FIG. 11, when the version of a functional generation is "n," a cryptographic key "m" and functions "A and B" are used. When the version of a functional generation is "n+1," a cryptographic key "m+1" and functions "A, B, and C" are used.

When the version of the functional generation of the UD information registry 12 is updated from "n" to "n+1" in step S35, the CPU 21 determines in step S36 whether the application 11 and the application 51 have the cryptographic key "m+1" and the function "C." As described with reference to FIG. 11, when the application 11 and the application 51 already have the cryptographic key "m+1" and the function "C," the application 11 and the application 51 do not need to obtain the cryptographic key "m+1" and the function "C," and thus the CPU 21 ends the update check process.

Figure 14:
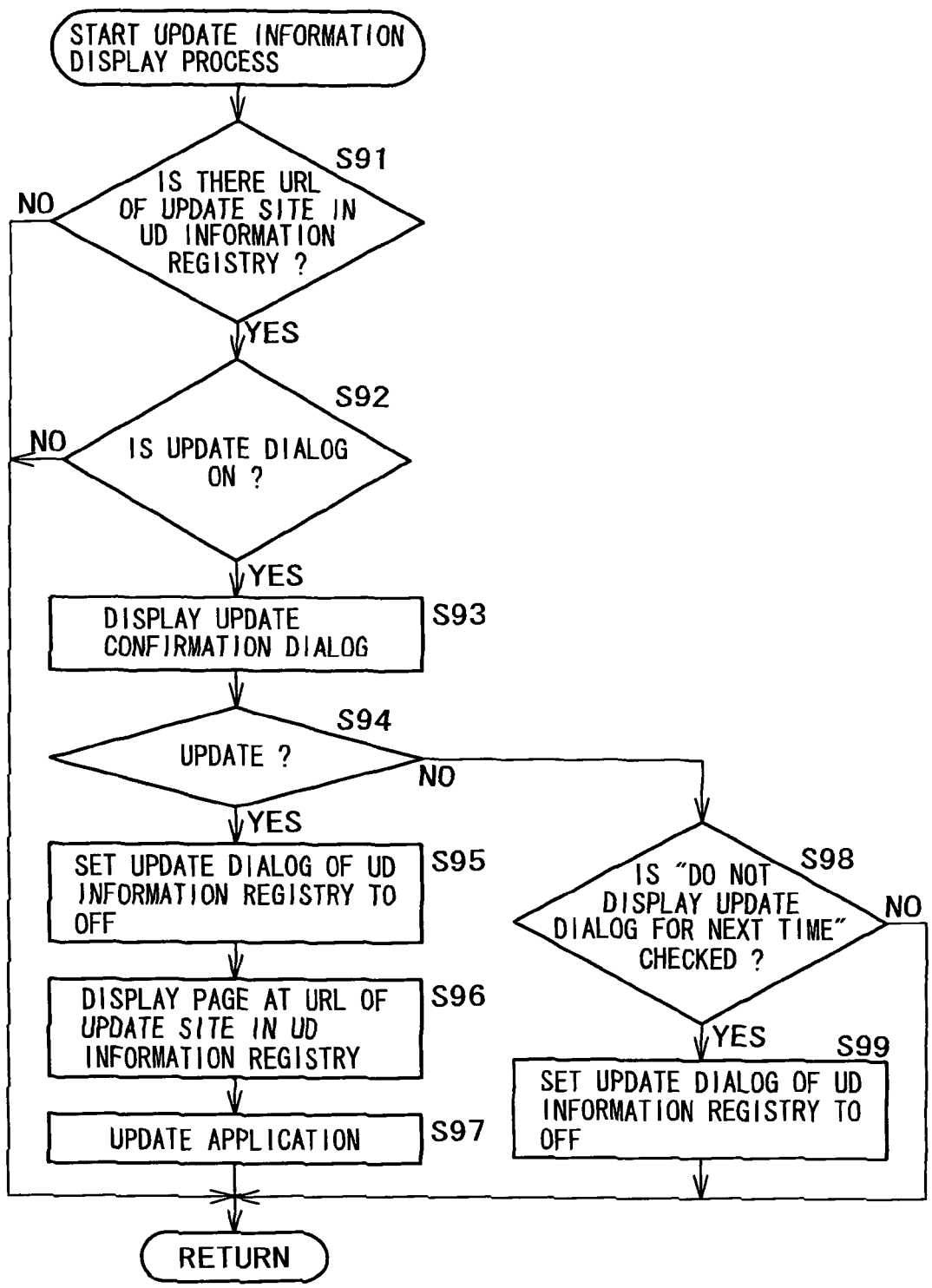
FIG. 14 is a flowchart of assistance in explaining an update information display process in step S72 in FIG. 13.

On the other hand, even when the application 11 and the application 51 have the same versions "Ver. α" and "Ver. β" as in FIG. 11, in a case where the application 11 or the application 51 has only the cryptographic key "m" and the functions "A and B," the CPU 21 determines that the application 11 or 51 does not have the cryptographic key and the function used in the updated functional generation. The process proceeds to step S37, where the CPU 21 sets the "update dialog" of the UD information registry 12 to ON, and then the update check process is ended. Thereby, when the application 11 or 51 is started, an update information display process to be described later with reference to FIG. 14 is performed.

On the other hand, when the CPU 21 determines in step S34 that the version of the functional generation of the server 4 is not newer than the version of the functional generation in the UD information register 12, the process proceeds to step S38, where the CPU 21 adds the update check period in the UD information file 16 to the time indicated by the clock included in the CPU 21, and updates (overwrites) the "update check" of the UD information registry 12. Thereby the update check process is ended.

Thus, the information of the newest UD information file 16 is registered in the UD information registry 12. The information in the UD information registry 12 is used when the application 11 or 51 is started on the basis of a user operation, as later described with reference to FIG. 13.

Figure 13:
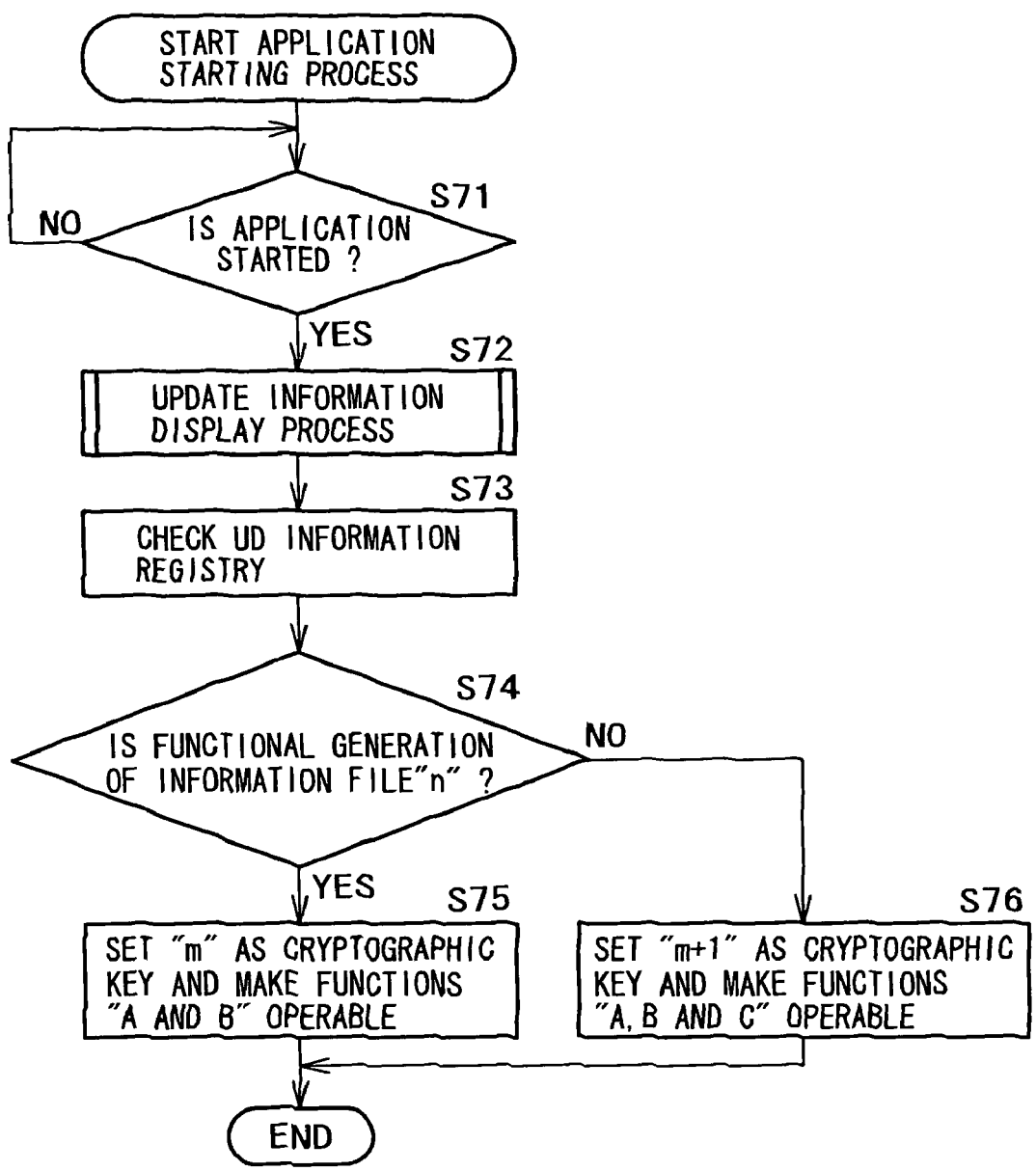
FIG. 13 is a flowchart of assistance in explaining an application starting process of the PC in FIG. 1.

A process of starting the application 11 will next be described with reference to the flowchart of FIG. 13. Incidentally, description of a process of starting the application 51 would be a repetition of the description of the process of starting the application 11 and will therefore be omitted. However, the same process is performed when the application 51 is started.

The user starts the application 11 by operating the mouse and the like including the input unit 26 of the PC 1 in order to receive the EMD service provided from the server 4 via the network 2.

In step S71, the CPU 21 stands by until the application 11 is started on the basis of an input signal from the input unit 26. When the CPU 21 determines that the application 11 is started, the CPU 21 proceeds to step S72 to perform an update information display process to be described later with reference to FIG. 14, and then proceeds to step S73. Thereby the application is updated with functions corresponding to the functional generation of the UD information registry 12.

In step S73, the CPU 21 checks the functional generation of the UD information registry 12. The process then proceeds to step S74, where the CPU 21 determines whether the functional generation of the UD information registry 12 is "n." When the CPU 21 determines in step S74 that the functional generation of the UD information registry 12 is "n," the process proceeds to step S75, where the CPU 21 sets "m" as a cryptographic key to be used by the application 11 and makes the functions "A and B" of the application 11 operable. The application 11 is thus started, and then the starting process is ended.

On the other hand, when the CPU 21 determines in step S74 that the functional generation of the UD information registry 12 is not "n" (in this case, when the CPU 21 determines that the functional generation of the UD information registry 12 is "n+1"), the process proceeds to step S76, where the CPU 21 sets "m+1" as a cryptographic key to be used by the application 11 and makes the functions "A, B, and C" of the application 11 operable. The application 11 is thus started, and then the starting process is ended.

As described above, the application 11 can set a combination of cryptographic keys, functions, protocols or the like corresponding to the updated functional generation on the basis of the UD information registry 12.

An update information display process in step S72 in FIG. 13 will next be described with reference to FIG. 14.

In step S91, the CPU 21 determines whether a URL of an update site is stored in the "update site" of the UD information registry 12. When the CPU 21 determines that a URL of an update site is stored in the "update site" of the UD information registry 12, the process proceeds to step S92. In step S92, the CPU 21 determines whether the "update dialog" of the UD information registry 12 is ON. When the CPU 21 determines that the "update dialog" of the UD information registry 12 is ON, that is, when the CPU 21 determines that there is update information necessary to make the application 11 correspond to the version of the functional generation of the UD information registry 12, the process proceeds to step S93, where the CPU 21 displays an update confirmation dialog on the LCD or the like forming the output unit 27.

The user selects an update button or a cancel button of the application 11 displayed in the update confirmation dialog on the LCD by operating the input unit 26. On the basis of an instruction from the input unit 26 operated by the user, the CPU 21 determines in step S94 whether to update the application 11. When the CPU 21 determines in step S94 that the application 11 is to be updated, the process proceeds to step S95.

In step S95, the CPU 21 sets the "update dialog" of the UD information registry 12 to OFF, and then proceeds to step S96. In step S96, the CPU 21 starts a program of a Web browser stored in the storage unit 28 or the like, and then displays a page of an update site on the LCD of the output unit 27 on the basis of the URL information of the "update site" in the UD information registry 12. Recognizing the page of the update site, the user gives an instruction to update the application 11 by operating the mouse or the like forming the input unit 26.

In response to the instruction, the CPU 21 in step S97 updates the application 11 using the setup program 15 of the server 4, whereby a setup process is ended. Specifically, the CPU 21 controls the communication unit 29 to download the setup program 15 from the update site for the setup program 15 of the server 4 via the network 2, and updates only a necessary part of the cryptographic keys, functions, or protocols constituting the functional generation of the application 11 using the downloaded setup program 15. Incidentally, at this time, only a necessary part of the cryptographic keys, functions, or protocols constituting the functional generation of the application 51 is also updated.

In the update confirmation dialog on the LCD, a button for prohibiting display of the update dialog for a next time is also displayed. The user inputs via the input unit 26 to express whether or not to display the update dialog for a next time. When the CPU 21 determines in step S94 that the application 11 is not to be updated, the CPU 21 determines in step S98 on the basis of an input signal from the input unit 26 whether the button for prohibiting display of the update dialog is selected or not. When the CPU 21 determines that the button for prohibiting display of the update dialog is selected, the CPU 21 in step S99 sets the "update dialog" of the UD information registry 12 to OFF, whereby the update information display process is ended.

When the CPU 21 determines in step S98 that the button for prohibiting display of the update dialog is not selected, the CPU 21 skips the process of step S99, whereby the update information display process is ended.

As described above, it is possible to inform the user of presence in the server 4 of the update information necessary to make the application 11 correspond to the version of the functional generation of the UD information registry 12 at a time of starting the application 11. The user can thereby maintain the functions of the application 11 in a new state to correspond to a new functional generation at all times.

As described above, by managing the version of a functional generation separately from the version of an application, when updating one application, it is possible to simultaneously update not only the application but also another application using a functional generation as a definition of a combination of the same cryptographic keys, functions, protocols or the like. Thereby presence of different functional generations in the same PC is prevented, and the user is saved the trouble of updating functions of a plurality of applications.

Further, it is possible to update only contents of music distribution service or the like, or a combination of the same cryptographic keys, functions, protocols or the like without updating the version of the application. Further, a plurality of cryptographic keys and a plurality of functions can be set up in an application in advance so as to provide various services by one application, for example a service A to a user having a functional generation n and a service B having added value in addition to the service A to a user having a functional generation n+1.

It is to be noted that while in the present embodiment, the optical disk 3 having a UD information file and a setup program recorded thereon is distributed, and the UD information file and the setup program are read on the PC 1, the present invention is not limited to recording media in the form of disks such as the optical disk 3 and the like; it is possible to record and distribute a UD information file and a setup program using recording media in the form of tapes such as magnetic tapes, semiconductor memories and the like.

The series of processes described above can be carried out not only by hardware but also by software. When the series of processes is to be carried out by software, a program including the software is installed from a program storing medium onto a computer incorporated in special hardware, or a general-purpose personal computer that can perform various functions by installing various programs thereon, for example.

As shown in FIG. 2, the program storing medium storing the program that is installed on a computer and is in a state of being executable by the computer is formed by a packaged medium including the optical disk 3 (including CD-ROM (Compact Disc-Read Only Memory) and DVD (Digital Versatile Disc)) or the like, or the ROM 22, the storage unit 28 or the like that stores the program temporarily or permanently.

It is to be noted that in the present specification, the steps describing the program recorded on the recording medium include not only processing carried out in time series in the described order but also processing carried out in parallel or individually and not necessarily in time series.

It is to be noted that in the present specification, a system refers to an apparatus as a whole formed by a plurality of apparatus.

INDUSTRIAL APPLICABILITY

As described above, according to the present invention, it is possible to provide newest functions in a plurality of applications.

The invention claimed

1. An information processing apparatus comprising:
a memory configure to separately store functional generation information and application software, wherein the functional generation information enables the application software, independent of a software version of the application software, to access functions when the functional generation information is concurrently located in the memory with the application software, the functional generation information including (1) a first URL that corresponds to an external location where an update to the functional generation information is registered, (2) a second URL that corresponds to an external location where an update to the application software is registered, and (3) a combination of cryptographic keys;
a managing unit configured to manage first functional generation information stored in said memory that enables the application software to access first functions;
obtaining means for obtaining second functional generation information that, if located in the memory, would enable the application software to access second functions, wherein the second functional generation information is registered at the first URL in an information providing apparatus that is remotely located from said information processing apparatus, wherein said information providing apparatus is connected to said information processing apparatus via a network, and wherein said obtaining means obtains said second functional generation information based on said first functional generation information;
comparing and determining means for comparing said first functional generation information and said second functional generation information and for determining which of said first or second functional generation information is a newest functional generation information;
information updating means for, when said comparing and determining means determines that said second functional generation information is newer than said first functional generation information, updating said first functional generation information stored in said memory to said newest functional generation information, such that said memory contains said second functional generation information and the application software, independent of the software version, is able access the second functions; and
application software updating means for updating the application software stored in said memory to application software located at the second URL of said second functional generation information, when said comparing and determining means determines that said second functional generation information is newer than said first functional generation information.

2. The information processing apparatus as claimed in claim 1, further comprising passage determining means for determining whether a predetermined time has passed on a basis of said first functional generation information,
wherein when said passage determining means determines that said predetermined time has passed, said obtaining means obtains said second functional generation information registered in said information providing apparatus via said network.

3. The information processing apparatus as claimed in claim 1, further comprising function determining means for determining whether said application software has the second functions corresponding to said second functional generation information when said comparing and determining means determines that said second functional generation information is newer than said first functional generation information,
wherein when said function determining means determines that said application software does not have the second functions corresponding to said second functional generation information, said application software updating means updates the application software stored in said memory to a newest application software corresponding to said second functional generation information.

4. The information processing apparatus as claimed in claim 1, further comprising:
medium determining means for determining whether a recording medium is loaded; and
reading means for reading third functional generation information that enables an application software recorded on said recording medium to access third functions when said medium determining means determines that said recording medium is loaded,
wherein said comparing and determining means compares said third functional generation information as well as said first functional generation information and said second functional generation information with each other and determines which of the first, second, or third functional generation information is a newest functional generation information,
wherein said information updating means updates said first functional generation information stored in said memory to said newest functional generation information, such that said memory contains said newest functional generation language, and wherein said application software updating means updates the application software stored in said memory to newest application software corresponding to said newest functional generation information.

5. The information processing apparatus as claimed in claim 4, wherein when said obtaining means does not obtain said second functional generation information via said network, said comparing and determining means compares said first functional generation information and said third functional generation information, and determines which of said first or third functional generation information is said newest functional generation information.

6. The information processing apparatus as claimed in claim 4, wherein when said comparing and determining process determines that said second functional generation information and said third functional generation information are identical with each other, said information updating means updates said first functional generation information stored in said memory to said third functional generation information, such that said memory contains said third functional generation language; and
   wherein said application software updating means updates the application software stored in said memory using application software corresponding to said third functional generation information.

7. An information processing method comprising:
   storing in a memory first functional generation information and application software, the first functional generation information including (1) a first URL that corresponds to an external location where an update to the functional generation information is registered, (2) a second URL that corresponds to an external location where an update to the application software is registered, and (3) a combination of cryptographic keys;
   obtaining second functional generation information, wherein the second functional generation information would enable the application software to access second functions if the second functional generation information is concurrently located in the memory with the application software, wherein the second functional information is registered at the first URL in an information providing apparatus that is remotely located from said information processing apparatus, and wherein said information providing apparatus is connected to said information processing apparatus via a network;
   comparing said second functional generation information to the first function generation information stored in the memory, wherein the first functional generation information enables the application software, independent of a software version of the application software, to access first functions;
   determining which of said first or second functional generation information is a newest functional generation information;
   updating, when it is determined that said second functional generation information is newer than said first functional generation information, said first functional generation information stored in said memory to said second functional generation information such that said memory contains said second functional generation information and said application software, independent of the software version, is enabled to access the second functions; and
   updating the application software stored in said memory to application software located at the second URL of said second functional generation information, when the determining determines that said second functional generation information is newer than said first functional generation information.

8. A non-transitory computer readable medium including computer executable instructions, wherein the instructions, when executed by a computer, cause the computer to perform a method comprising:
   storing in a memory of the computer a first functional generation information and application software, the first functional generation information including (1) a first URL that corresponds to an external location where an update to the functional generation information is registered, (2) a second URL that corresponds to an external location where an update to the application software is registered, and (3) a combination of cryptographic keys;
   obtaining second functional generation information, wherein the second functional generation information would enable the application software to access second functions if the second functional generation information is concurrently located in the memory of the computer with the application software, wherein the second functional information is registered at the first URL in an information providing apparatus that is remotely and separately located from the computer, and wherein said information providing apparatus is connected to the computer via a network;
   comparing said second functional generation information to the first functional generation information stored in the memory, wherein the first functional generation information enables the application software, independent of a software version of the application software, to access first functions;
   determining which of said first or second functional generation information is a newest functional generation information;
   updating, when it is determined that said second functional generation information is newer than said first functional generation information, said first functional generation information stored in the memory of the computer to said second functional generation information, such that the memory of the computer contains said second functional generation information and said application software, independent of the software version, is enabled to access the second functions; and
   updating the application software stored in said memory to application software located at the second URL of said second functional generation information, when the determining determines that said second functional generation information is newer than said first functional generation information.

9. A non-transitory computer readable medium including computer executable instructions, wherein the instructions, when executed by a processor, cause the processor to perform a method comprising:
   storing in a memory of the computer a first functional generation information and application software, the first functional generation information including (1) a first URL that corresponds to an external location where an update to the functional generation information is registered (2) a second URL that corresponds to an external location where an update to the application software is registered, and (3) a combination of cryptographic keys;
   obtaining second functional generation information, wherein the second functional generation information would enable the application software to access second functions if the second functional generation information is concurrently located in the memory with the application software, wherein the second functional information is registered at the first URL in an information providing apparatus that is remotely located from said information processing apparatus, and wherein said information providing apparatus is connected to said information processing apparatus via a network;

comparing said second functional generation information to the first functional generation information stored in said memory, wherein the first functional generation information enables the application software, independent of a software version of the application software, to access first functions;

determining which of said first or second functional generation information is a newest functional generation information;

updating, when it is determined that said second functional generation information is newer than said first functional generation information, said first functional generation information stored in said memory to said second functional generation information, such that said memory contains said second functional generation information and said application software, independent of the software version, is enabled to access the second functions; and updating the application software stored in said memory to application software located at the second URL of said second functional generation information, when the determining determines that said second functional generation information is newer than said first functional generation information.

10. The information processing apparatus as claimed in claim 1, wherein said functional generation information is shared among a plurality of application software located in said memory, such that each of the plurality of application software is enabled to access said functions independent of software versions of the plurality of application software.

11. The information processing apparatus as claimed in claim 1,
wherein said information processing apparatus is a personal computer;
wherein said information providing apparatus is a server configured to provide said personal computer a music content distribution service;
wherein said application software receives a copyrighted material from said music content distribution service; and
wherein said functional generation information enables said application software to receive and use said copyrighted material.

12. The information processing apparatus as claimed in claim 4,
wherein said information processing apparatus is a personal computer;
wherein said information providing apparatus is a server configured to provide said personal computer a music content distribution service;
wherein said recording medium is a optical disc; and
wherein the third functional generation information would enable said application software located to access said third functions if said third functional generation information and said application software are concurrently located in the memory of said personal computer.

13. The method as claimed in claim 7, further comprising:
determining whether a predetermined time has passed on a basis of said first functional generation information; and
obtaining, when said determining determines that said predetermined time has passed, said second functional generation information registered in said information providing apparatus via said network.

14. The method as claimed in claim 7, further comprising:
determining whether said application software has the second functions corresponding to said second functional generation information when the determining determines that said second functional generation information is newer than said first functional generation information; and
updating, when said determining determines that said application software does not have the second functions corresponding to said second functional generation information, the application software stored in said memory to a newest application software corresponding to said second functional generation information located at the second URL.

15. The non-transitory computer readable medium including computer executable instructions, wherein the instructions, when executed by a processor, cause the processor to perform a method as claimed in claim 9, said method further comprising:
determining whether a predetermined time has passed on a basis of said first functional generation information; and
obtaining, when said determining determines that said predetermined time has passed, said second functional generation information registered in said information providing apparatus via said network.

16. The non-transitory computer readable medium including computer executable instructions, wherein the instructions, when executed by a processor, cause the processor to perform a method as claimed in claim 9, said method further comprising updating the application software stored in said memory to application software corresponding to said second functional generation information located at the second URL when the determining determines that said second functional generation information is newer than said first functional generation information.

17. The non-transitory computer readable medium including computer executable instructions, wherein the instructions, when executed by a processor, cause the processor to perform a method as claimed in claim 9, said method further comprising:
determining whether said application software has the second functions corresponding to said second functional generation information when the determining determines that said second functional generation information is newer than said first functional generation information; and
updating, when said determining determines that said application software does not have the second functions corresponding to said second functional generation information, the application software stored in said memory to a newest application software corresponding to said second functional generation information located at the second URL.

18. An information processing apparatus comprising:
a memory configured to separately store functional generation information and application software, wherein the functional generation information enables the application software to access functions, independent of a software version of the application software, when the functional generation information is concurrently located in the memory with the application software, the functional generation information including (1) a first URL that corresponds to an external location where an update to the functional generation information is registered, (2) a second URL that corresponds to an external location where an update to the application software is registered, and (3) a combination of cryptographic keys;

a managing unit configured to manage first functional generation information stored in said memory that enables the application software to access first functions;

an obtaining unit configured to obtain second functional generation information that, if located in the memory, would enable the application software to access second functions, wherein the second functional generation information is registered at the first URL in an information providing apparatus that is remotely located from said information processing apparatus, wherein said information providing apparatus is connected to said information processing apparatus via a network, and wherein said obtaining unit obtains said second functional generation information based on said first functional generation information;

a comparing and determining unit configured to compare said first functional generation information and said second functional generation information and configured to determine which of said first or second functional generation information is a newest functional generation information;

an information updating unit configured to update said first functional generation information stored in said memory to said newest functional generation information, when said comparing and determining unit determines that said second functional generation information is newer than said first functional generation information, such that said memory contains said second functional generation information and the application software, independent of the software version, is able to access the second functions; and application software updating unit configured to update the application software stored in said memory to application software located at the second URL of said second functional generation information, when said comparing and determining unit determines that said second functional generation information is newer than said first functional generation information.

* * * * *